(No Model.)
J. S. LIPPS.
RACKING BUNG.
No. 253,932.  Patented Feb. 21, 1882.
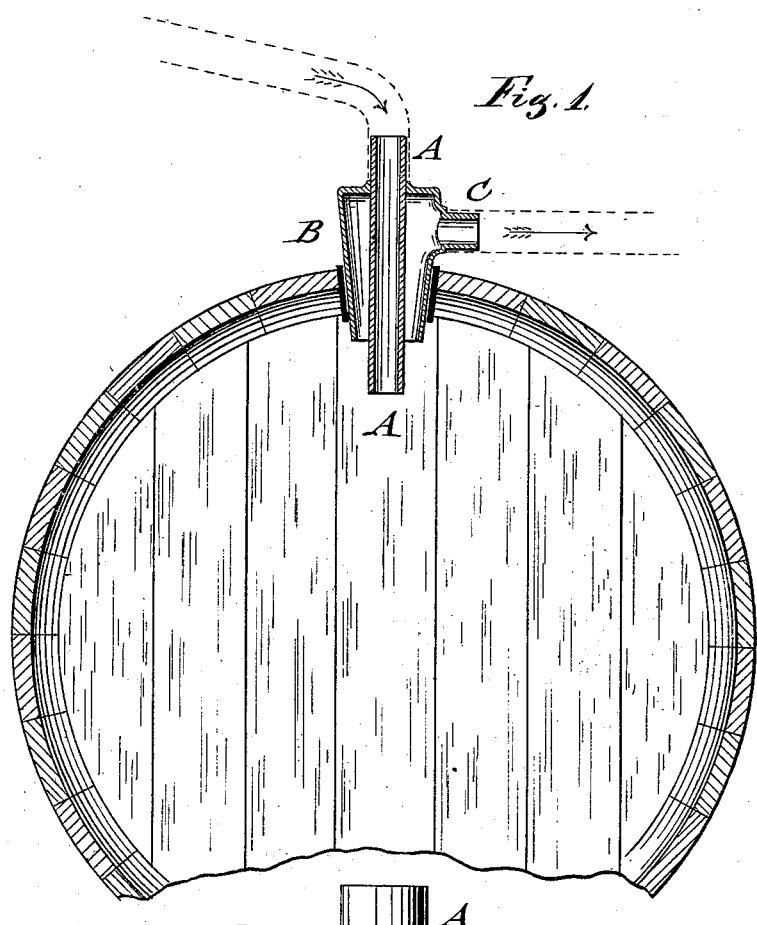
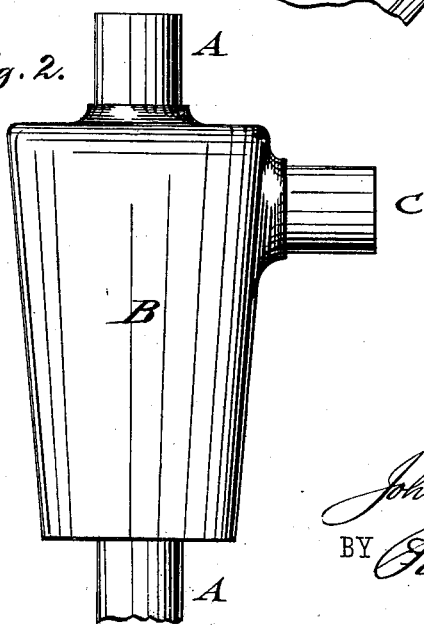
WITNESSES:
Carl Kach
Otto Risch
INVENTOR
John S. Lipps
BY Paul Goepel
ATTORNEY

UNITED STATES PATENT OFFICE.

JOHN S. LIPPS, DECEASED, (ALGERNON S. SULLIVAN, ADMINISTRATOR,) OF NEW YORK, N. Y.

RACKING-BUNG.

SPECIFICATION forming part of Letters Patent No. 253,932, dated February 21, 1882.

Application filed June 3, 1881. (No model.)

*To all whom it may concern:*

Be it known that I, JOHN S. LIPPS, of the city, county, and State of New York, have invented certain new and useful Improvements in Racking-Bungs, of which the following is a specification.

In the racking off of beer, ale, and other fermented liquors, especially in the racking off of ale, the barrel is filled with liquid, and when full closed temporarily by a bung and then rolled aside, so as to give time for the foam to settle. When this is accomplished it is filled up with ale by a hand-can until all the foam is expelled. Finally the permanent bung is driven in and the barrel laid up for storage, being then ready for sale. This requires a great deal of storage capacity in the racking-room, and occasions considerable extra work and loss of liquid.

My invention has for its object to do away with the tedious process of racking, as described, and to fill the barrels directly for final bunging; and the invention consists of a racking bung, the central supply-tube of which is surrounded by an exterior conically-tapering tube, which is closed at the top and open at the bottom and provided with a side discharge-tube near the upper end. When filling the barrel the gradually-rising level of the liquid expels the foam through the outer tube of the bung and admits thereby the final bunging.

In the accompanying drawings, Figure 1 represents a vertical central section of my improved racking-bung as attached to a barrel, and Fig. 2 is a side view of the same on an enlarged scale.

Similar letters of reference indicate corresponding parts.

In the drawings, A represents the central supply-tube of my improved racking-bung, which supply-tube is connected by a rubber tube, or otherwise, to the fermenting-tub or racking-vat, if such a one is employed in the brewery. The central tube, A, is surrounded by a conically-tapering exterior tube, B, which is connected to the central tube, below the upper end of the same, and closed at the top, but open at the bottom, the exterior tube, B, being furthermore provided with a discharge-tube, C, near the top thereof. It is seated tightly by means of a rubber or other packing into the bung-hole of the barrel, and the discharge-tube C then connected by a rubber pipe to a second barrel or collecting-tub, so that the liquid is gradually filling the barrel, first causing all the foam to pass into the next barrel or collecting-tub through the rubber pipe. Finally, as the level of the liquid rises above the barrel and in the exterior tube, B, up to a level with the discharge-tube, the surplus liquid is conducted to the next barrel or tub. The barrel is thus filled up to the bung with ale or other fermented liquor, so as to be ready for final bunging. The fact of its being full is clearly indicated to the attendant by the sagging of the connected rubber pipe, owing to the weight of the liquid passing through the same, while the light foam exerts no perceptible influence thereon. The racking-bung is then removed and applied to the next barrel, and so on, and the barrel finally bunged without requiring any settling of the foam. In this manner considerable time and expense is saved in racking, and the same accomplished with less loss of liquid than heretofore.

Having thus described my invention, I claim as new and desire to secure by Letters Patent—

A racking-off bung consisting of a central supply-tube connected with a rubber tube and surrounded by a conically-tapering exterior tube, which latter is connected to the central tube below its upper end, and closed at the top, but open at the bottom, and of a lateral discharge-tube connected to the exterior tube, substantially as described.

In testimony that I claim the foregoing as my invention I have signed my name, in presence of two witnesses, this 1st day of June, 1881.

JOHN S. LIPPS.

Witnesses:
PAUL GOEPEL,
CARL KARP.